(12) United States Patent
Chou et al.

(10) Patent No.: US 9,407,830 B2
(45) Date of Patent: Aug. 2, 2016

(54) FRAMEWORK AND METHOD FOR CONTROLLING ILLUMINATION OF OBJECT BEING PHOTOGRAPHED

(71) Applicant: HON HAI PRECISION INDUSTRY CO., LTD., New Taipei (TW)

(72) Inventors: Chien-Min Chou, New Taipei (TW); Po-Jen Hsu, New Taipei (TW); Chih-Yuan Chuang, New Taipei (TW); Jung-Yi Lin, New Taipei (TW); Chih-Te Lu, New Taipei (TW); Shu-Yuan Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/689,633

(22) Filed: Apr. 17, 2015

(65) Prior Publication Data

US 2016/0191778 A1    Jun. 30, 2016

(30) Foreign Application Priority Data

Dec. 31, 2014    (TW) .............................. 103146428 A

(51) Int. Cl.
*H04N 5/225*    (2006.01)
*H04N 5/235*    (2006.01)

(52) U.S. Cl.
CPC ........... *H04N 5/2354* (2013.01); *H04N 5/2256* (2013.01); *H04N 5/2351* (2013.01)

(58) Field of Classification Search
CPC .............................................. G03B 2215/0057
USPC .................. 348/371, 211.3; 396/182, 157
See application file for complete search history.

(56) References Cited

U.S. PATENT DOCUMENTS

| | | | |
|---|---|---|---|
| 9,250,499 B2 * | 2/2016 | Clark | H04N 5/2256 |
| 2004/0151487 A1 * | 8/2004 | Iwasaki | G03B 7/16 396/182 |
| 2004/0234259 A1 * | 11/2004 | Muramatsu | G03B 15/05 396/157 |

FOREIGN PATENT DOCUMENTS

TW    201443542 A    11/2014

* cited by examiner

*Primary Examiner* — Joel Fosselman
(74) *Attorney, Agent, or Firm* — ScienBiziP, P.C.

(57) ABSTRACT

A method for controlling illumination of an object being photographed includes generating and sending an invitation signal to a number of secondary electronic devices to join a group for photographing the object, generating and sending a photosensing signal to each of the secondary electronic devices in the group to detect an illumination value of the object, focusing an image of the object and detecting an illumination value of the object, detecting a distance value between the object and the primary electronic device, detecting a distance value between the object and each of the secondary electronic devices, and calculating a required flash driving current and a required flash duration of the primary electronic device and each of the secondary electronic devices and a required exposure time for photographing the object. The object is photographed by the first electronic device.

14 Claims, 5 Drawing Sheets

FRAMEWORK AND METHOD FOR CONTROLLING ILLUMINATION OF OBJECT BEING PHOTOGRAPHED

FIELD

The subject matter herein generally relates to photography, and more particularly to a framework and a method for controlling illumination of an object being photographed.

BACKGROUND

Generally, illumination of an object being photographed is influenced by ambient light around the object. A camera photographing the object may use a flash to enhance illumination of the object. Due to a size limitation, a flash in a handheld electronic device such as a mobile phone or a tablet computer is usually too small to provide a sufficient illumination for an object to be photographed when in a dim environment.

BRIEF DESCRIPTION OF THE DRAWINGS

Implementations of the present technology will now be described, by way of example only, with reference to the attached figures.

DETAILED DESCRIPTION

Figure 1:
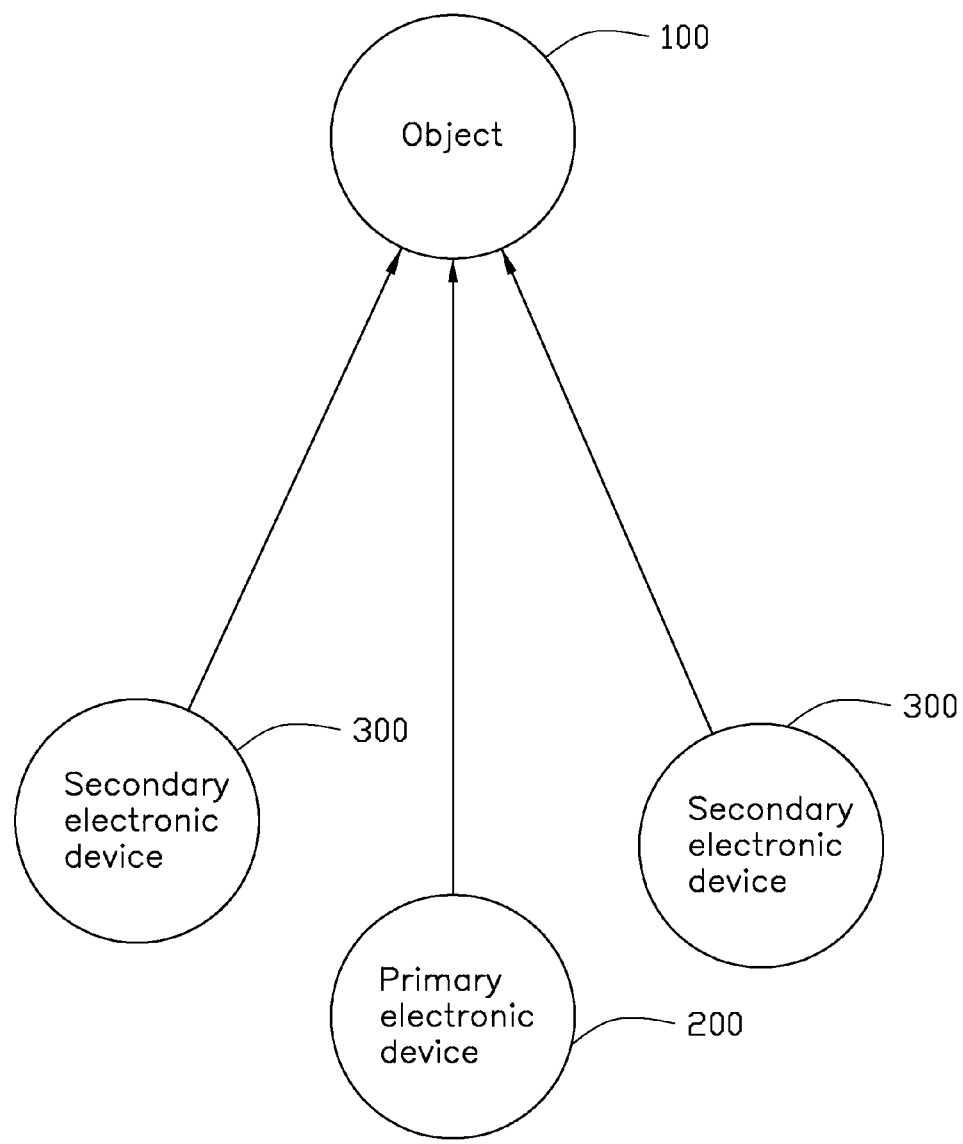
FIG. 1 is a diagrammatic view of a framework for photographing an object.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

In general, the word "module" as used hereinafter refers to logic embodied in hardware or firmware, or to a collection of software instructions, written in a programming language such as, for example, Java, C, or assembly. One or more software instructions in the modules can be embedded in firmware such as in an erasable-programmable read-only memory (EPROM). It will be appreciated that the modules can comprise connected logic units, such as gates and flip-flops, and can comprise programmable units, such as programmable gate arrays or processors. The modules described herein can be implemented as either software and/or hardware modules and can be stored in any type of computer-readable medium or other computer storage device.

FIG. 1 illustrates an embodiment of a framework for photographing an object 100. The framework can include a primary electronic device 200 and a plurality of secondary electronic devices 300. The primary electronic device 200 and each of the plurality of secondary electronic devices 300 can emit a flash when photographing the object 100. In at least one embodiment, the object 100 is photographed by the primary electronic device 200, and the primary electronic device 200 controls each of the plurality of secondary electronic devices 300 to emit the flash when the primary electronic device 200 photographs the object 100. In at least one embodiment, the primary electronic device 200 and the plurality of secondary electronic devices 300 can each be a mobile device such as a mobile phone, a tablet computer, or the like.

Figure 2:
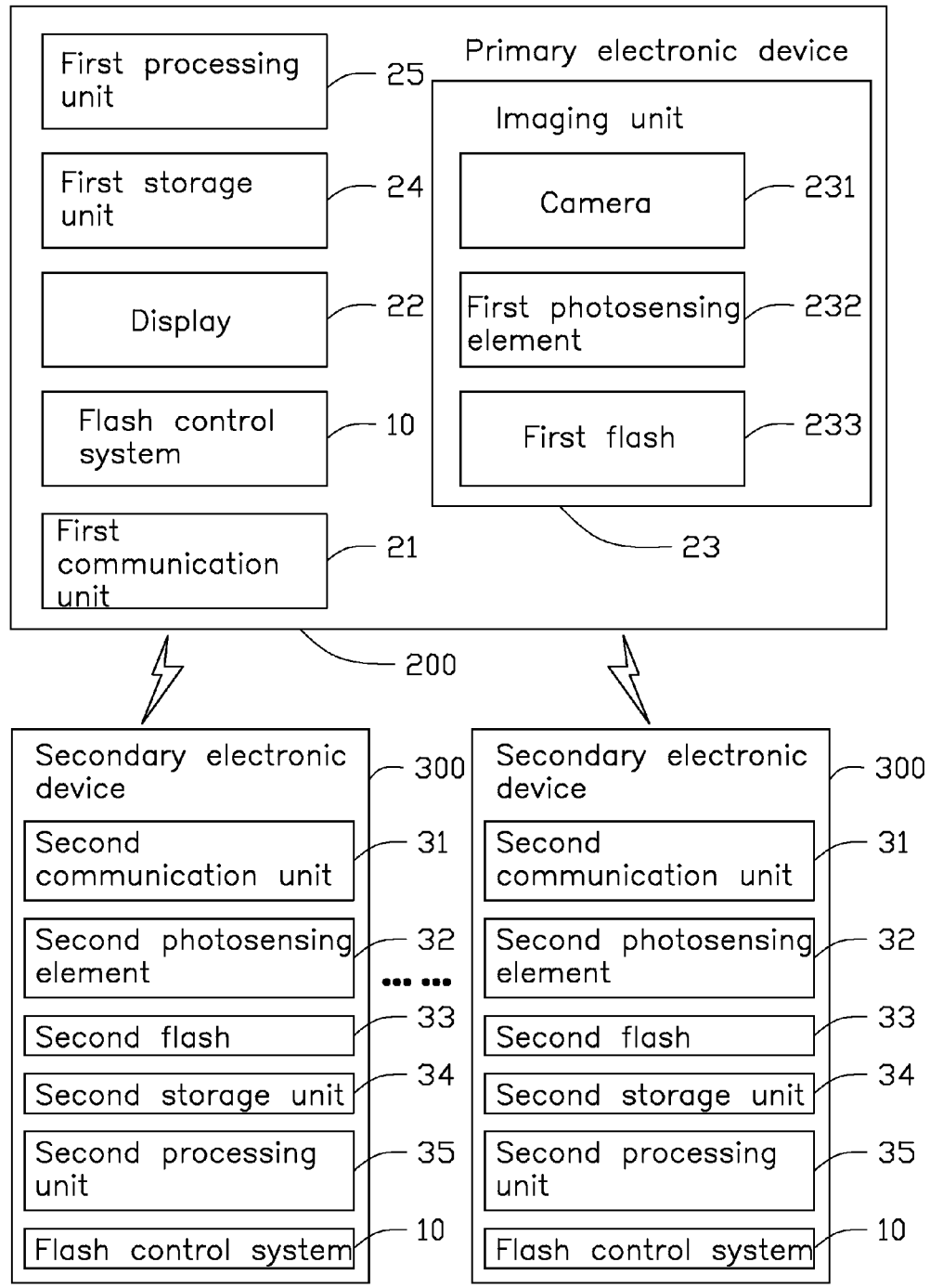
FIG. 2 is a block diagram of a primary electronic device and a plurality of secondary electronic devices of the framework.

Referring to FIG. 2, the primary electronic device 200 and each of the plurality of secondary electronic devices 300 can include a flash control system 10 to control the primary electronic device 200 and each of the secondary electronic devices 300 to emit the flash. The primary electronic device 200 can include a first communication unit 21, a display 22, an imaging unit 23, a first storage unit 24, and a first processing unit 25. The first communication unit 21 is used to wirelessly communicate with each of the secondary electronic devices 300. The primary electronic device 200 can wirelessly communicate with each of the plurality of secondary electronic devices 300 through infrared, BLUETOOTH®, WIFI®, ZIGBEE®, Z-WAVE®, or other suitable wireless communication method. The display 22 can display an interface for photographing the object 100. The imaging unit 23 can include a camera 231, a first photosensing element 232, and a first flash 233. Each of the plurality of secondary electronic devices 300 can include a second communication unit 31 for wirelessly communicating with the first communication unit 21, a second photosensing element 32, a second flash 33, a second storage unit 34, and a second processing unit 35.

Figure 3:
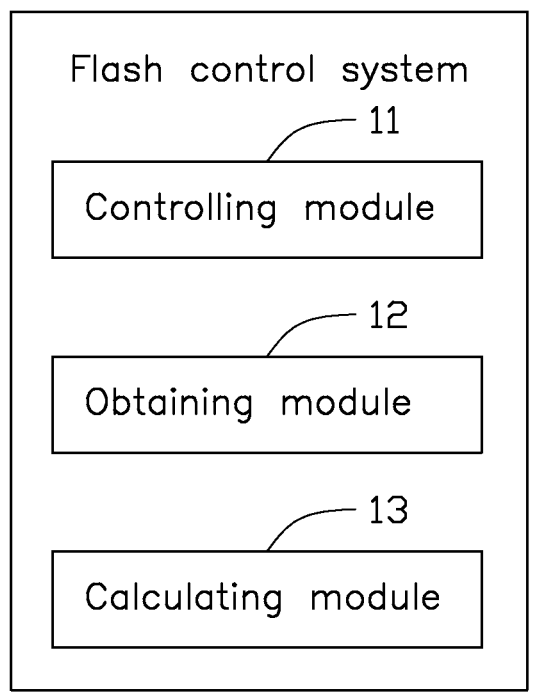
FIG. 3 is a block diagram of function modules of a flash control system executed in the primary electronic device and the plurality of secondary electronic devices.

Referring to FIG. 3, the flash control system 10 can include a controlling module 11, an obtaining module 12, and a calculating module 13. The modules 11-13 can include one or more software programs in the form of computerized codes stored in the first storage unit 24 and the second storage unit 34. The computerized codes can include instructions executed by the first processing unit 25 and the second processing unit 35 to provide functions for the modules 11-13.

The controlling module 11 executed in the primary electronic device 200 can generate a plurality of signals and control the first communication unit 21 to send the plurality of signals to each of the plurality of secondary electronic devices 300. The controlling module 11 executed in the primary electronic device 200 can generate an invitation signal to invite each of the plurality of secondary electronic devices 300 to join a group for photographing the object 100. The controlling module 11 executed in the plurality of secondary electronic devices 300 can generate a confirmation signal to join the group, and the second communication unit 31 can send the confirmation signal to the first communication unit 21. After receiving the confirmation signals, the controlling module 11 executed in the primary electronic device 200 can generate a photosensing signal to detect an illumination value of the object 100. The controlling module 11 executed in the primary electronic device 200 can control the camera 231 to focus an image of the object 100. The photosensing signal can control the first photosensing element 232 to detect the illumination value of the object 100 from the focused image.

The first communication unit 21 can send the photosensing signal to the second communication unit 31. The controlling module 11 executed in the plurality of secondary electronic device 300 can control the second photosensing element 32 to detect an illumination value of the object 100 after receiving the photosensing signal. The second communication unit 31 can send the illumination value to the first communication unit 21.

The controlling module 11 executed in the primary electronic device 200 can generate a distance detecting signal to detect a distance value between the object 100 and the primary electronic device 200. In at least one embodiment, the distance value is determined by the camera 231. In another embodiment, the distance value can be detected by a corresponding distance detection device (not shown) of the primary electronic device 200. For example, the distance value can be detected by a positioning device calculating a distance difference between a position of the object 100 and a position of the primary electronic device 200. The first communication unit 21 can send the distance detecting signal to the second communication unit 31 to control the plurality of secondary electronic devices 300 to detect the distance value between the object 100 and the corresponding secondary electronic device 300. In at least one embodiment, the distance value can be detected by a corresponding distance detection device (not shown), such as a positioning device, of the plurality of secondary electronic devices 300.

The obtaining module 12 executed in the primary electronic device 200 can obtain the illumination values and the distance values.

The calculating module 13 executed in the primary electronic device 200 can calculate an optimal flash driving current value of the first flash 233 and of the second flash 33, an optimal flash duration of the first flash 233 and of the second flash 33, and an optimal exposure duration for photographing the object 100.

When the primary electronic device 200 photographs the object 100, the controlling module 11 executed in the primary electronic device 200 can control the camera 231 to photograph the object 100 according to the optimal exposure duration, and simultaneously generate a flash command signal to control the first flash 233 to emit the flash according to the optimal flash driving current and the optimal flash duration. The first communication unit 21 can send the flash command signal to the second communication unit 31 to control the second flash 33 to emit the flash according to the optimal flash driving current and the optimal flash duration. Thus, illumination of the object 100 being photographed can be increased or balanced.

In at least one embodiment, the camera 231 and the first flash 233 can be separate components. In another embodiment, the camera 231 and the first flash 233 can be integrated with each other. The first and second photosensing elements 232 and 32 can each be a charge coupled device, a complementary metal-oxide semiconductor, or the like.

Figure 4:
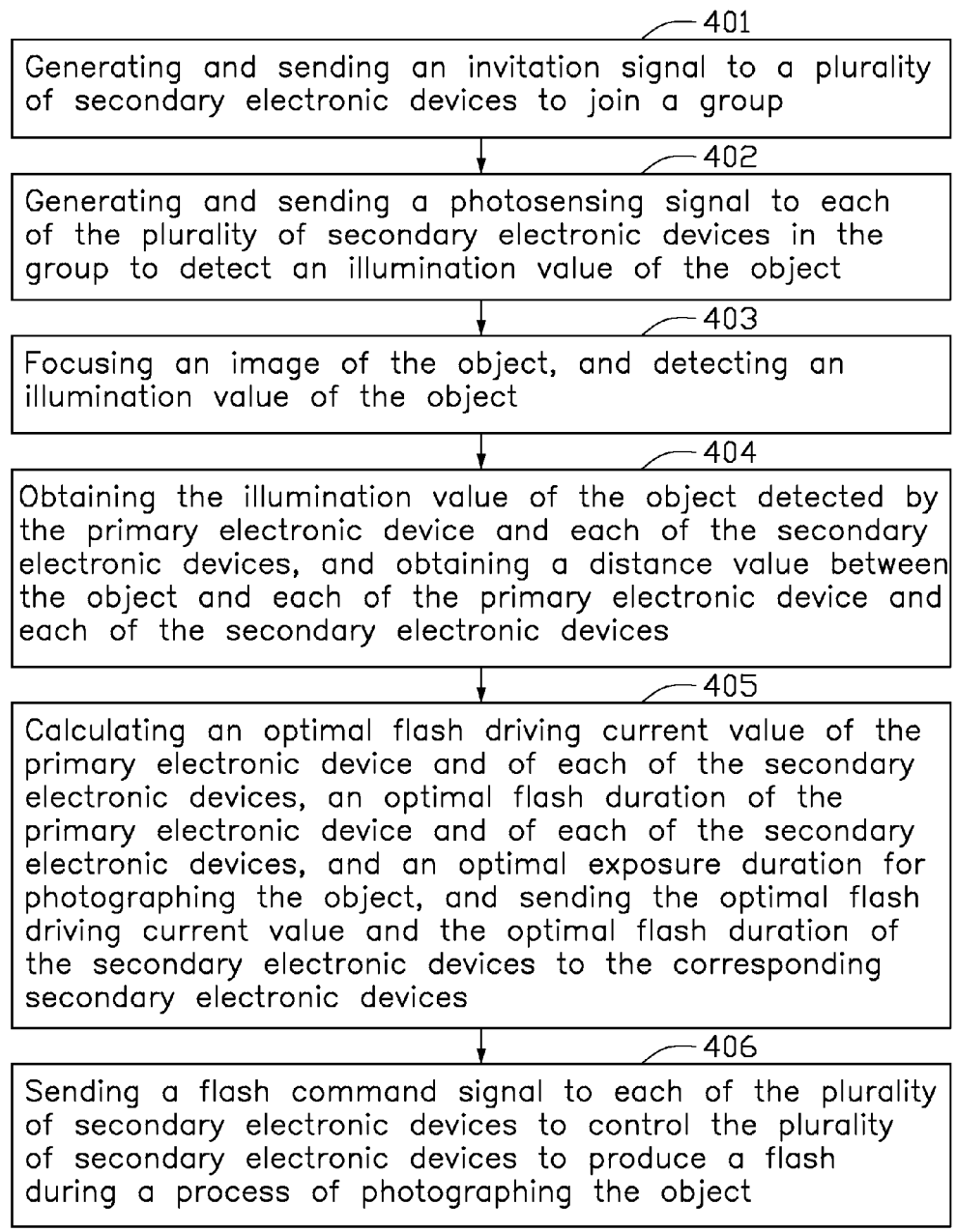
FIG. 4 is a flowchart of a method for a primary electronic device of a framework to emit a flash while photographing an object.

FIG. 4 illustrates a flowchart of an exemplary method for a primary electronic device of a framework to emit a flash while photographing an object. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 401.

At block 401, the primary electronic device can generate and send an invitation signal to a plurality of secondary electronic devices to join a group for photographing the object.

At block 402, the primary electronic device can generate and send a photosensing signal to each of the plurality of secondary electronic devices in the group to detect an illumination value of the object.

At block 403, the primary electronic device can focus an image of the object and detect an illumination value of the object.

At block 404, the primary electronic device can obtain the illumination value of the object detected by the primary electronic device and each of the plurality of secondary electronic devices, and obtain a distance value between the object and each of the primary electronic device and the plurality of secondary electronic devices. In at least one embodiment, the distance value is determined by a positioning device of the primary electronic device and the plurality of secondary electronic devices. In another embodiment, the distance value determined by the primary electronic device is determined by a camera of the primary electronic device.

At block 405, the primary electronic device can calculate an optimal flash driving current value of the primary electronic device and of each of the secondary electronic devices, an optimal flash duration of the primary electronic device and of each of the plurality secondary electronic devices, and an optimal exposure duration for photographing the object. The primary electronic device can send the optimal flash driving current value and the optimal flash duration of the plurality of secondary electronic devices to the corresponding secondary electronic devices.

At block 406, the primary electronic device can generate and send a flash command signal to each of the plurality of secondary electronic devices to control the plurality of secondary electronic devices to produce a flash, during a process of photographing the object. The primary electronic device and the plurality of secondary electronic devices can each produce a flash according to the optimal flash driving current values and the optimal flash driving durations.

Figure 5:
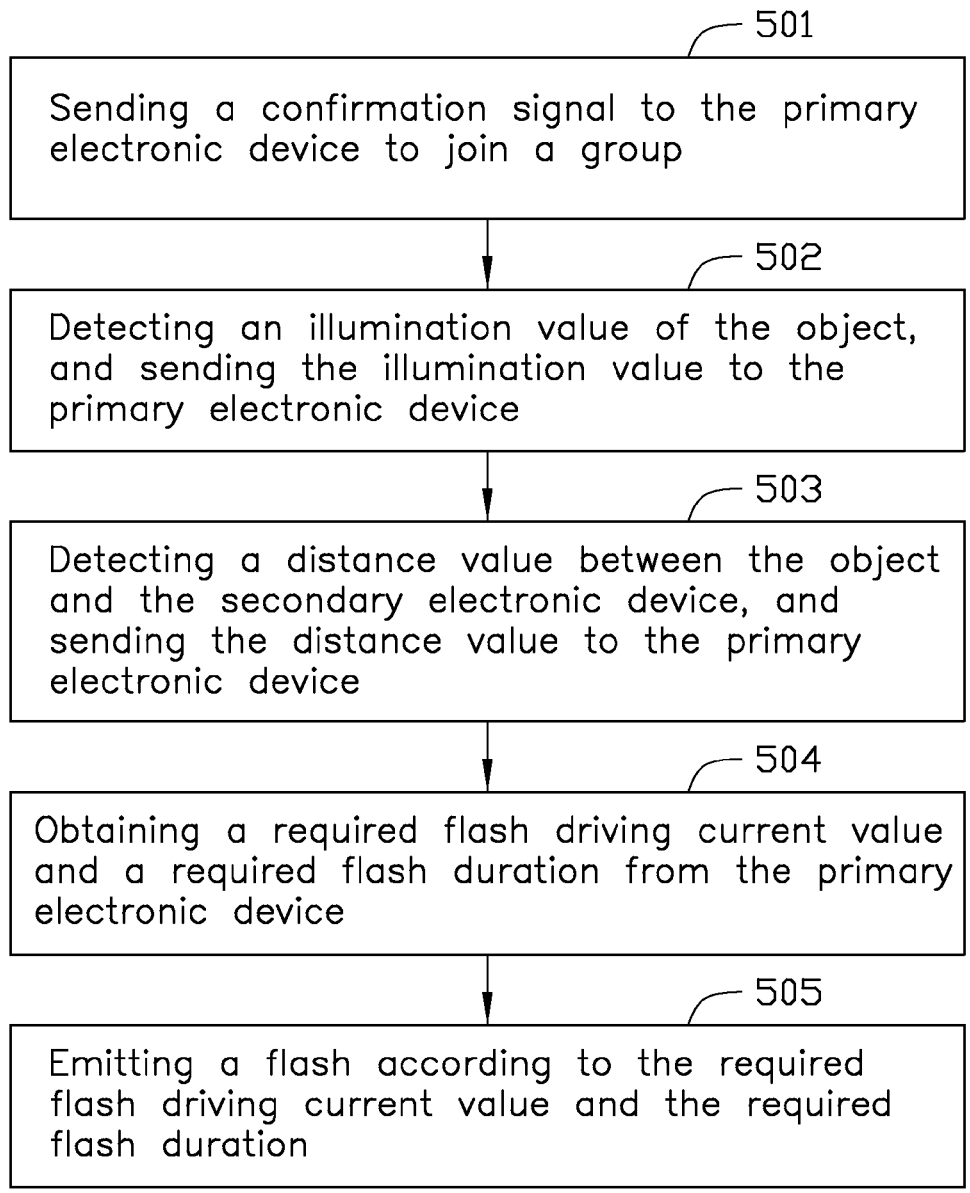
FIG. 5 is a flowchart of a method for a secondary electronic device of a framework to emit a flash while photographing an object.

FIG. 5 illustrates a flowchart of an exemplary method for a secondary electronic device of a framework to emit a flash while photographing an object. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 501.

At block 501, the secondary electronic device can receive an invitation signal sent from a primary electronic device, and send a confirmation signal to the primary electronic device to join a group for photographing the object.

At block 502, the secondary electronic device can detect an illumination value of the object in response to a photosensing signal sent from the primary electronic device, and send the illumination value to the primary electronic device.

At block 503, the secondary electronic device can detect a distance value between the object and the secondary electronic device in response to a distance detection signal sent from the primary electronic device, and send the distance value to the primary electronic device.

At block 504, the secondary electronic device can obtain an optimal flash driving current value and an optimal flash duration for emitting a flash during a process of photographing the object. The optimal flash driving current value and the optimal flash duration are calculated by the primary electronic device according to the detected illumination value and the detected distance value.

At block 505, the secondary electronic device can emit a flash according to the optimal flash driving current value and the optimal flash duration in response to a flash control signal sent from the primary electronic device for photographing the object.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of capturing a digital image of an object by a primary electronic device having a camera and a first flash, the method comprising:
   generating and sending a request, by the primary electronic device, to one or more secondary electronic devices to detect an illumination value of the object, each secondary electronic device comprising a second flash;
   focusing the camera of the primary electronic device on a capturable image of the object;
   detecting, by the primary electronic device, an illumination value of the object and a distance value between the object and the camera;
   generating and sending, by the primary electronic device, a request to each of the one or more secondary electronic devices to detect a distance value between the object and the secondary electronic device;
   obtaining, by the primary electronic device, from each of the one or more secondary electronic devices the illumination value detected by the secondary electronic device, and the distance value between the object and the secondary electronic device;
   calculating, by the primary electronic device, based at least in part on the illumination value and the distance value detected by the primary electronic device and the illumination value and the distance value detected by each of the one or more secondary electronic devices, an optimal flash driving current value and an optimal flash duration for the first flash and each of the one or more secondary electronic devices, and an optimal exposure duration for the primary electronic device camera;
   generating and sending, by the primary electronic device, a flash command signal directed to each of the secondary electronic devices to produce a flash based on the optimal flash driving current value and the optimal flash duration as calculated for each of the one or more secondary electronic devices, while the first flash produces a flash based on the calculated optimal flash driving current value and the optimal flash duration for the primary electronic device for capturing the image of the object for the calculated optimal exposure duration.

2. The method as in claim 1, wherein the distance value between the object and the primary and secondary electronic devices is detected by a corresponding camera or distance measuring device of the primary and secondary electronic devices.

3. The method as in claim 1, wherein the distance value between the object and the primary and secondary electronic devices is detected by a corresponding position detection device of the primary and secondary electronic devices determining a distance between position coordinates of the object and the primary and secondary electronic devices.

4. The method as in claim 1, wherein the primary electronic device is in wireless communication with each of the plurality of secondary electronic devices.

5. A framework for photographing an object, the framework comprising:
   a primary electronic device configured to photograph the object; and
   at least one secondary electronic device configured to emit a flash while the primary electronic device photographs the object;
   wherein the primary electronic device is in wireless communication with the at least one secondary electronic device;
   wherein the primary electronic device invites the at least one secondary electronic device to join a group for photographing the object;
   wherein the primary and the at least one secondary electronic device each detect an illumination value of the object;
   wherein the primary and the at least one secondary electronic device each detect a distance value between the object and the primary and the at least one secondary electronic device, respectively; and
   wherein the primary electronic device emits a flash and controls the at least one secondary electronic device to emit the flash while photographing the object according to the illumination values and the distance values.

6. The framework as in claim 5, wherein the primary electronic device and the at least one secondary electronic device each comprise a flash control system configured to determine the illumination values and the distance values, and control the primary electronic device and the at least one secondary electronic device to emit the flash according to the illumination values and the distance values.

7. The framework as in claim 6, wherein the primary electronic device comprises:
   a first communication unit configured to wirelessly communicate with the at least one secondary electronic device;
   a display configured to provide an interface for photographing the object;
   an imaging unit configured to detect the illumination value and photograph the object;
   a storage unit configured to store a plurality of instructions of a plurality of modules of the flash control system; and
   a processing unit configured to execute the plurality of instructions of the plurality of modules of the flash control system.

8. The framework as in claim 7, wherein the imaging unit comprises:
   a camera configured to photograph the object;
   a first photosensing element configured to detect the illumination value of the object; and
   a first flash configured to emit the flash.

9. The framework as in claim 8, wherein the at least one secondary electronic device comprises:
   a second communication unit configured to wirelessly communicate with the first communication unit of the primary electronic device;
   a second photosensing element configured to detect the illumination value of the object;
   a second flash configured to emit the flash;
   a second storage unit configured to store the plurality of instructions of the plurality of modules of the flash control system; and
   a second processing unit configured to execute the plurality of instructions of the plurality of modules of the flash control system.

10. The framework as in claim 9, wherein the flash control system comprises a controlling module, an obtaining module, and a calculating module.

11. The framework as in claim 10, wherein for the flash control system executed in the primary electronic device:
   the controlling module is configured to generate a plurality of signals and control the first communication unit of the primary electronic device to send the plurality of signals to the second communication unit of the at least one secondary electronic device, control the camera to focus an image of the object, control the photosensing element to detect the illumination value of the object, control the primary electronic device to determine the distance value between the object and the primary electronic device, control the camera to photograph the object, and control the primary electronic device to emit the flash according to the illumination value and the distance value;
   the obtaining module is configured to obtain the illumination values and the distance values detected by the primary and secondary electronic devices; and
   the calculating module is configured to calculate an optimal flash driving current value of the first flash and of the second flash, an optimal flash duration of the first flash and of the second flash, and an optimal exposure duration for photographing the object.

12. The framework as in claim 11, wherein the plurality of signals sent from the first communication unit to the second communication unit comprises:
   an invitation signal to invite the at least one secondary electronic device to join the group;
   a photosensing signal to detect the illumination value of the object;
   a distance detecting signal to detect a distance between the object and the secondary electronic device; and
   a flash command signal to produce the flash while the primary electronic device photographs the object.

13. The framework as in claim 12, wherein the optimal flash driving current value and the optimal flash duration of the second flash are sent to the second communication unit by the first communication unit, and the obtaining module obtains the optimal flash driving current value and the optimal flash duration from the second communication unit.

14. The framework as in claim 10, wherein for the flash control system executed in the at least one secondary electronic device:
   the controlling module is configured to send a confirmation signal to the primary electronic device to confirm joining the group, control the second photosensing element to detect the illumination value of the object in response to a corresponding signal received from the primary electronic device, control the at least one secondary electronic device to detect the distance value between the object and the at least one secondary electronic device according to a corresponding signal received from the primary electronic device, control the second communication module to send the illumination value and the distance value to the primary electronic device, and control the second flash to emit the flash in response to a corresponding signal when the primary electronic device photographs the object; and
   the obtaining module is configured to obtain the optimal flash driving current value and the optimal flash duration of the second flash calculated by the primary electronic device.

* * * * *